United States Patent
Elshout

(10) Patent No.: US 6,863,831 B2
(45) Date of Patent: Mar. 8, 2005

(54) FILTRATION DEVICE

(75) Inventor: Jacques Elshout, Sassenheim (NL)

(73) Assignee: Akzo Nobel N.V., Arnhem (NL)

( * ) Notice: Subject to any disclaimer, the term of this patent is extended or adjusted under 35 U.S.C. 154(b) by 44 days.

(21) Appl. No.: 10/157,719

(22) Filed: May 28, 2002

(65) Prior Publication Data
US 2002/0175130 A1 Nov. 28, 2002

Related U.S. Application Data
(60) Provisional application No. 60/303,901, filed on Jul. 9, 2001.

(30) Foreign Application Priority Data
May 28, 2001 (EP) ............................................. 01202003

(51) Int. Cl.⁷ .......................... B01D 29/00; B01D 29/27
(52) U.S. Cl. ....................... 210/767; 210/232; 210/315; 210/445; 210/448; 210/452; 210/456
(58) Field of Search ................................ 210/767, 232, 210/237, 315, 317, 445, 452, 456, 448

(56) References Cited
U.S. PATENT DOCUMENTS

| 1,494,677 A | 5/1924 | Feldmeier |
| 3,959,137 A | 5/1976 | Kirsgalvis |
| 4,024,065 A | 5/1977 | Morgan, Jr. ................. 210/315 |
| 4,133,769 A | 1/1979 | Morgan, Jr. ................. 210/455 |
| 4,204,966 A | 5/1980 | Morgan, Jr. ................. 210/455 |
| 4,220,542 A | 9/1980 | Morgan, Jr. ................. 210/474 |
| 4,259,188 A | 3/1981 | Morgan ...................... 210/448 |
| 4,285,814 A | 8/1981 | Morgan, Jr. ................. 210/315 |
| 4,390,425 A | 6/1983 | Tafara et al. ............... 210/232 |
| 4,460,468 A | 7/1984 | Morgan ...................... 210/445 |
| 5,643,451 A | 7/1997 | Harris et al. ................ 210/448 |

FOREIGN PATENT DOCUMENTS

| EP | 0 318 993 | 6/1989 | ............ A61M/1/36 |
| GB | 978065 | 12/1964 | |

Primary Examiner—David A. Reifsnyder
(74) Attorney, Agent, or Firm—Joan M. McGillycuddy; Michelle J. Burke

(57) ABSTRACT

Filtration device comprising an inlet for the supply of the liquid to be filtered and means for holding a filter crossing the flow path beyond the inlet. The inlet opens into an annular intermediate passage which narrows down in the flow direction to an annular slit. The inlet opens into the annular passage in a tangential direction. The device comprises a support screen for support of a removable filter, and a dome leaving a small gap between its outline and the support screen when it is positioned in the support screen.

14 Claims, 2 Drawing Sheets

FILTRATION DEVICE

This application claims priority of European Patent application No. 01202003.8 filed on May 28, 2001 and U.S. Pat. No. 60/303,901 filed on Jul. 9, 2001.

FIELD OF THE INVENTION

The invention relates to a filtration device comprising an inlet for the supply of the liquid to be filtered and means for holding a filter crossing the flow path beyond the inlet.

BACKGROUND OF THE INVENTION

U.S. Pat. No. 4,220,542, U.S. Pat. No. 4,285,814, and U.S. Pat. No. 4,390,425 disclose filtration devices used for filtering liquids which can contain various types of contamination, such as sand, dirt or coagulates. Removable filters are used, which are replaced when their permeability falls below a given limit. A specific application is found in the production of paints, where generally several filtration steps are included in several stages of production.

Filtration devices need to be cleaned regularly, for example when after filtering one batch of liquid, a new batch of another type, such as a paint of a different colour, needs to be filtered. Cleaning filtration devices is a time-consuming and laborious job. The filtered liquid tends to stick in places which are hard to reach by mere rinsing with a cleaning liquid. Generally, large amounts of cleaning liquid need to be used for rinsing. Furthermore, relatively large amounts of liquid to be filtered are still left in the device, e.g. in the inlet, when it is opened for cleaning.

Due to the size of the inlet in comparison to the volume of the filter bags in the prior art systems, the liquid to be filtered is distributed unequally over the filter bags. As a result, the filter will lose permeability at its bottom side first. When the filter is removed, an amount of liquid will still be present in the filter bag, resulting in considerable losses. U.S. Pat. No. 4,220,542 proposes to use a hollow closed container to reduce these losses. However, the container fills only a limited part of the filter bag and is hard to clean. Furthermore, unequal flow distribution also reduces the efficiency of rinsing with a cleaning liquid.

SUMMARY OF THE INVENTION

The object of the invention is to solve these problems encountered with the prior art systems. A further object is to provide a filtration device allowing easier cleaning and minimization of product losses. Another object of the invention is a production method, particularly for paints or coating compositions, minimizing the level of contamination and losses as result of filtration steps.

The object of the invention is achieved with a filtration device having an inlet opening into a substantially annular intermediate passage narrowing down in the flow direction to a substantially annular slit along the inner side of the filter's upper edge. This way, the annular intermediate space distributes the liquid to be filtered over the filter. Narrowing down in the flow direction results in increased pressure when the liquid is squirted into the inner space of the filtration device. This enhances the efficiency of rinsing with a cleaning liquid considerably.

BRIEF DESCRIPTION OF THE DRAWINGS

The invention will be further explained by the following figures. In the drawings.

DETAILED DESCRIPTION

Figure 1:
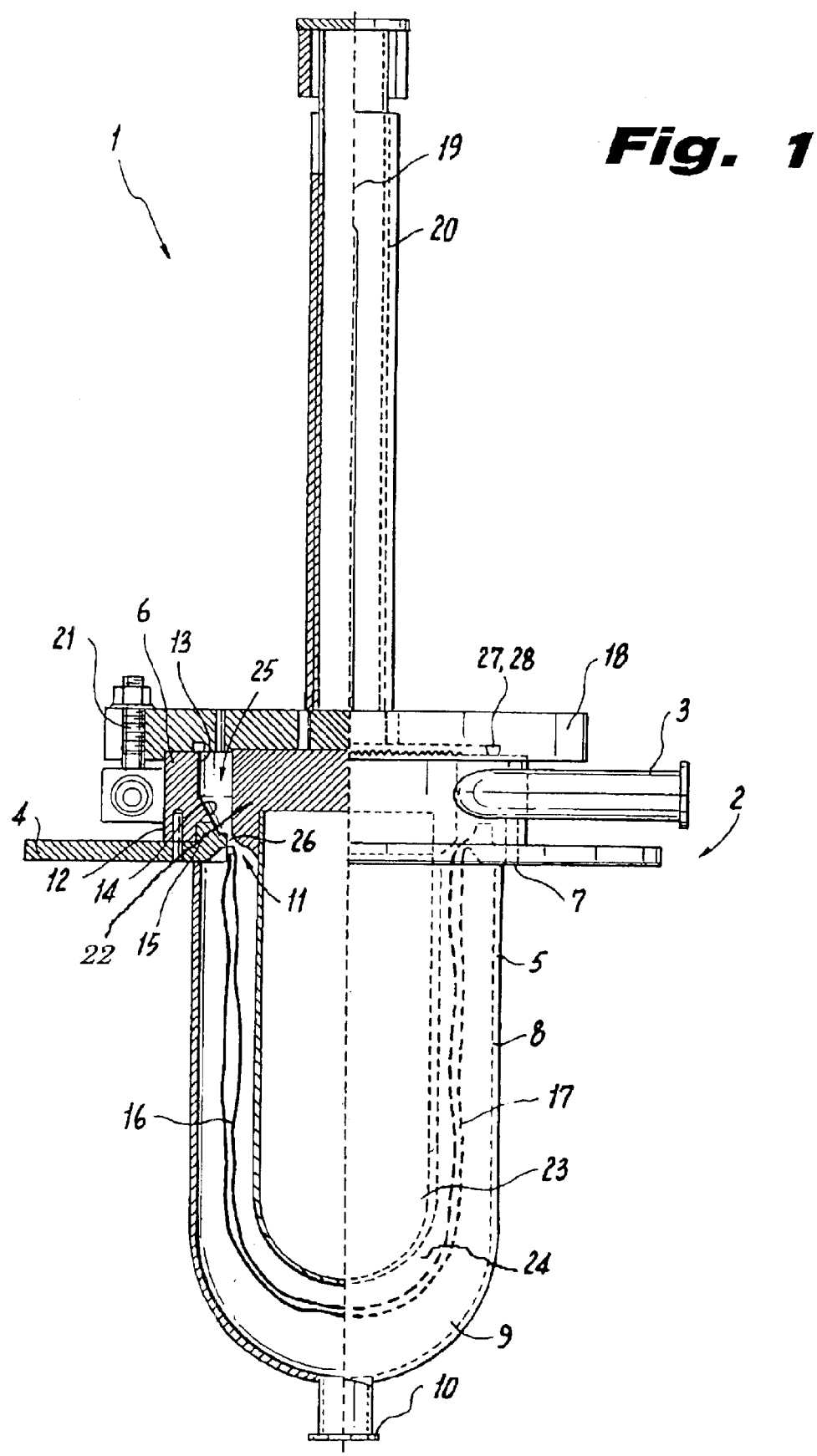
FIG. 1 shows a filtration device according to the invention.

In this respect, "annular" can refer to closed outlines or C-shaped outlines surrounding a substantial part of the outline of the filtration device. "Annular" may for example refer to circular, oval, elliptical, rectangular or polygonal outlines.

In order to prevent bottlenecks in the flow of the liquid to be filtered, the device should preferably be hydraulically optimized. This can be done by making the radial cross-section of the annular space smaller than 1.1 times the cross-section of the inlet perpendicular to the local flow direction and/or by making the passage of the annular slit smaller than 1.1 times the radial cross-section of the annular space. Preferably, the radial cross-section of the annular space is substantially equal to the cross-section of the inlet perpendicular to the local flow direction. It is also preferred to make the passage of the annular slit substantially equal to the radial cross-section of the annular space. By such hydraulic optimization of the flow path, less product is left behind when the filtration is stopped, which results in lower losses and improved cleaning.

In a particularly preferred embodiment, the inlet opens into the annular space in a tangential direction. This tangential component of the flow direction results in a spiralling flow path and consequently in a further optimized distribution of the liquid to be filtered over the annular slit. Another advantage is that the annular space can be thoroughly cleaned by rinsing it with cleaning liquid, which spirals down the annular space a number of times before passing the annular slit. After passing the annular slit, the liquid will still have a spiraling flow, giving better distribution of the liquid over the filter.

A suitable embodiment of the device according to the present invention includes a substantially annular space defined by an upper edge of the device on the one hand and the outline of a protrusion of a cap or lid closing the upper end of the device on the other. Opening the lid gives direct access to the walls defining the annular space, allowing better cleaning.

Preferably, the upper edge is a replaceable part, allowing for instance easier repair or cleaning. The means for holding a filter can be integrated in this replaceable part. Since most suppliers of filter bags have their own system of filter attachment, the use of such a replaceable, modular upper edge makes it much easier to change to a different system of filter attachment.

Suitable means for holding a filter are for example snap joints or, if flanged filters are used, the flanges can be placed in corresponding recesses and held in place for instance by a closing lid. Examples of filter attachments are disclosed in U.S. Pat. No. 4,259,188, U.S. Pat. No. 4,285,814, and U.S. Pat. No. 5,643,451.

To prevent the rupture of filter material during filtering, the filtration device preferably comprises a support screen for support of a removable filter. The permeability of such a support screen should be greater than the permeability of the removable filter. Such a screen may for example comprise a metal wire mesh.

In an embodiment particularly suitable for small batches, the support screen is a substantially flat screen for supporting a flat removable filter. However, for larger batches, it may be preferred to make use of a support screen which is substantially basket-shaped for supporting a suitable removable filter bag, enabling larger amounts to pass per time interval.

If filter bags are used instead of flat filters, the filtration device may optionally comprise a so-called dome filling the greater part of the filter bag in order to prevent major product loss. Basket-shaped support screens allow the optional use of a dome leaving a small gap, preferably of constant width, between its outline and the support screen. The width of the gap should be such as to leave enough space for a suitable filter bag. This minimizes the presence of left liquid when the filtering process is stopped for removal and replacement of the filter.

The dome may be connected to a lid or cap for closing off the device. This way, the dome would be removed when opening the lid. The dome can be maximized if the device comprises lifting means for lifting the lid, preferably vertically. Pneumatic lifting means are preferred.

The filtration device may comprise a housing with an outlet. Alternatively, the filtration device can be used without a housing, and be positioned directly in a hopper or container, for example the hopper of a filling line for packing the filtered liquid into tins or other containers.

The present invention also includes a method for producing a liquid compound by adding components in more than one mixing step and at least one filtration step, for instance the production of paints, where filtration is performed using a filtration device as described above after all mixing steps have been carried out. A particularly suitable example of such a method according to the invention is a method for producing a paint where the finished paint is filtered using a filtration device as described above before it is packed in containers. In prior art production of paints; filtration is required between several production steps. The filtration device according to the present invention makes it possible to omit the filtration steps between the various production steps, since a single filtration as the final production step is sufficient for obtaining a paint with the desired purity. Due to the optimized flow characteristics, the filtration device according to the present invention allows a high throughput, as required by filling operations, in combination with a high filtration efficiency. This results in high purity of the filtered liquid in a single filtration step and low product losses during batch changeover.

FIG. 1 shows, half in cross-section, half in front view, a filtration device 1 according to the present invention. The filtration device 1 comprises a housing 2 with an inlet 3. The housing 2 comprises a mounting plate 4, a dome-shaped casing 5 mounted on the bottom side of the mounting plate 4, and a ring 6 mounted by means of bolted joints 7 on the top of the mounting plate 4. The dome-shaped casing 5 comprises a cylindrical body 8 with an open top end. The bottom end of the dome-shaped casing is a semi-spherical part 9 opening into a tubular outlet 10. The ring 6 and the open top end of the casing 5 are fixed around a circular opening 11 in the mounting plate 4. At its outer diameter, the ring 6 has a vertical side wall 12. In cross-section the upper half 13 of the ring 6 is rectangular, but the lower half 14 gradually broadens in downward direction. Along its inner diameter at its bottom side, the ring 6 shows a recess enclosing a second ring 15 fixed to the mounting plate 4 along the outline of the circular opening 11. The second ring 15 comprises a snap joint for the attachment of a removable filter bag 16. A support screen 17 for supporting the removable filter 16 is attached to the second ring 15, protruding into the casing 5. The shape of the support screen 17 is substantially the same as the shape of the casing 5. The support screen 17 is made of a permeable metal screen and has a permeability greater than the total permeability of the removable filter 16. During the filtering of a liquid, the filter material is pressed against the support screen 17, which prevents rupture of the filter material.

At the top end of the ring 6 the filtration device 1 is closed off by a removable lid 18. Via a slideway comprising a slide bar 19 and a guide bush 20 connected to the lid 18, the lid 18 can be lifted by a pneumatic lifting device, not shown in the drawing. In the closing position the lid 18 can be firmly locked to the ring 6 by bolted joints 21. At its bottom end, the lid 18 comprises a cylindrical socket 22 carrying a hollow dome 23, which, when the lid 18 is closed, protrudes into the inner space of the casing 5, leaving a gap 24 between its outline and the support screen 17.

The inlet 3 opens into an annular intermediate space 25 defined by the outer diameter of socket 22 on the one hand and the inner diameter of the ring 6 on the other. Since the outer diameter of the socket 22 is a vertical wall, while the inner diameter of the ring 6 slopes inwardly in the downward direction, the annular space 25 narrows down in the flow direction. The inlet 3 is arranged in such a way that it opens into the annular space 25 in a tangential direction. The annular space 25 opens into the inner space of the casing 5 via an annular slit 26 of a constant width.

A flush sealing ring 27 is located in a concentric dovetail groove 28 which is slightly wider than the ring's thickness, allowing limited movement of the sealing ring 27. When the lid 18 is in the open position, the sealing ring 27 slightly protrudes. When the lid 18 is in the closing position, the sealing ring 27 presses on the upper surface of the ring 6, along its inner edge, in order to prevent the liquid to be filtered from penetrating between the lid 18 and the ring 6.

The cross-section of the inlet 3 in a plane perpendicular to the drawing has about the same surface area as the cross-section of the annular space 25 in the plane of the drawing, which in turn is of about the same size as the surface defined by the annular slit 26 when viewed from above.

To reduce friction and sticking of liquid to a minimum, all inner surfaces contacting the liquid to be filtered are made of smoothly polished steel.

Liquids to be filtered enter the filtration device 1 via inlet 3, spiralling down in the annular space 25, via the annular slit 26. Due to the narrowing geometry of the annular space 25, the liquid passes the annular slit 26 under some pressure. The liquid enters the inner space of the casing 5 and is forced to pass the filter bag 16 and the support screen 17. After being filtered, the liquid leaves the casing 5 via the tubular outlet 10.

During use, the permeability of the filter bag diminishes. When the filter is blocked or the permeability falls below a certain level, the filter bag should be removed. The presence of the dome prevents large amounts of liquid from staying behind in the filter bag when it is removed.

To clean the filtration device 1, cleaning liquid, for instance water or solvents, can be fed into the device 1 via inlet 3. Due to the tangential inlet direction, the cleaning liquid will spiral down, passing and cleaning the complete outline of the socket 22 and the inner side of the ring 6, before passing the annular slit 26. Due to the narrowing geometry of the annular space 25, the cleaning liquid will be distributed equally over the annular slit 26. When passing the annular slit 26, the cleaning liquid still has a flow direction with a tangential component, so it will spiral down the dome 23 and the support screen 17 before it leaves the outlet 10.

An alternative embodiment may consist of a filtration device similar to the one shown in FIG. 1, except that it does not comprise a casing 5. Such an embodiment could for example be positioned in a hopper, such as the hopper of a filling line for packing paint.

Figure 2:
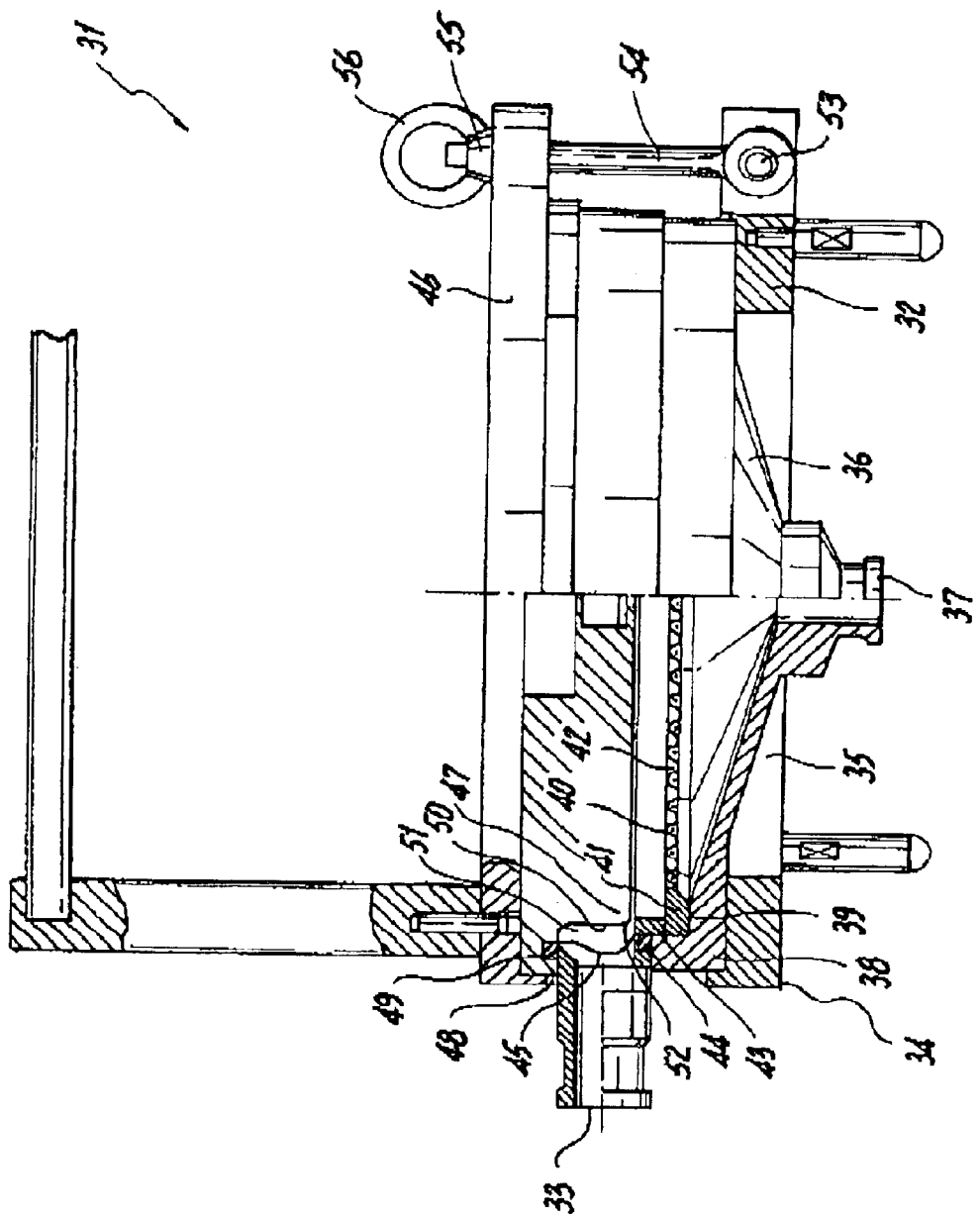
FIG. 2 shows an alternative embodiment of a filtration device according to the invention.

FIG. 2 shows an alternative embodiment of a filtration device according to the invention, one which is particularly useful for filtering smaller batches. The filtration device 31 comprises a housing 32 with an inlet 33. The housing 32 comprises a mounting plate 34 with a circular opening 35. A cone-shaped casing 36 is mounted along its outer edge on the mounting plate 34, pointing downward and protruding into the circular opening 35. The downward-pointing end of the cone-shaped casing 36 opens into an outlet 37. The outer edge of the casing 36 comprises a circular rim 38 defining at its inner diameter a shoulder 39 for positioning a circular support screen 40 for a removable filter. The screen 40 comprises a circular edge 41 stretching a metal wire mesh 42. A first ring 43 rests on the top of the rim 38 and the filter edge 41, enclosing a rubber sealing ring 44. The side wall 45 of the ring 43 at its inner diameter is shaped as a reversed "S".

Filtration device 31 also comprises a lid 46 with an outer diameter overlapping the ring 43. On its bottom side, the lid 46 comprises a cylindrical protrusion 47 protruding into the space enclosed by the ring 43. The protrusion 47 is concentric to the ring 43, leaving a circumferential shoulder 48 free on the bottom side of the lid 46 where it rests on the ring 43. A rubber sealing ring 49 is located in a recess in the shoulder 48, clamped between the lid 46 and the ring 43 when the lid 46 is closing off the filtration device 31. The outer diameter of the protrusion 47, defined by a vertical wall 50 on the one side and the reversed "S"-shaped wall of the ring 43 on the other, defines an annular intermediate space 51, narrowing down in the flow direction and opening into the inner space of the filtration device 31 via an annular slit 52. The inlet 33 opens into the annular intermediate space 51 in a radial direction. As in the embodiment of FIG. 1, the cross-section of the annular intermediate space 51 in the plane of the drawing has about the same surface area as the cross-section of the inlet 33 in a plane perpendicular to the drawing, which in turn is of about the same size as the surface area defined by the annular slit 52 when viewed from above.

The lid 46 can be clamped in the closing position by means of the bolts 54 and the nuts 55 screwed down using the handle 56. In the drawing, only one set of bolts 54 and nuts 55 is shown. Bolt 54 is rotatably connected to a support plate 32. The bolts 54 protrude through an open recess in the lid 46. The lid 46 can be removed by loosening the nuts 55 and turning the bolts 54 aside.

To clean the filtration device 31, cleaning liquid is supplied via inlet 33. The cleaning liquid spirals down, passing and cleaning the annular space 51 before passing the annular slit 26. Due to the narrowing geometry of the annular space 51, the cleaning liquid is distributed equally over the annular slit 52, where it flows along the lower surface of the lid 46, the support screen 42, and the inner surface of the housing 36 before it leaves the outlet 37.

Also in this embodiment, all inner surfaces contacting the liquid to be filtered, are made of smoothly polished steel to reduce friction and sticking of liquid to a minimum.

What is claimed is:

1. A filtration device comprising an inlet for the supply of the liquid to be filtered and means for holding a filter crossing the flow path beyond the inlet, characterized in that the inlet opens into a substantially annular intermediate space, the annular intermediate space narrowing down in the flow direction to a substantially annular slit, the annular slit being along and opening into the inner side of the filter's upper edge.

2. The device according to claim 1, wherein the annular slit has a substantially constant width.

3. The device according to claim 1, wherein the radial cross-section of the annular space is smaller than 1.1 times the cross-section of the inlet perpendicular to the local flow direction.

4. The device according to claim 1, wherein the passage of the annular slit is smaller than 1.1 times the radial cross-section of the annular space.

5. The device according to claim 1, wherein the inlet opens into the annular space in a tangential direction.

6. The device according to claim 1, wherein the annular space is defined by an upper edge of the device on the one hand and the outline of a protrusion of a cap or wall closing the upper end of the device on the other.

7. The device according to claim 1, wherein the device comprises a support screen for support of a removable filter, the total permeability of the support screen being greater than the total permeability of the removable filter.

8. The device according to claim 7, wherein the support screen is a substantially flat screen for supporting a flat removable filter.

9. The device according to claim 7, wherein the support screen is a substantially basket-shaped screen for supporting a suitable removable filter bag.

10. The device according to claim 9, wherein the device comprises a dome leaving a small gap between its outline and the support screen when it is positioned in the support screen.

11. The device according to claim 10, wherein the dome is connected to a lid or cap for closing off the device.

12. The device according to claim 11, wherein the device comprises lifting means, for lifting the lid.

13. A method for producing a liquid compound by adding components in more than one mixing step and at least one filtration step, wherein filtration is performed using a device according to claim 1 after all mixing steps have been carried out.

14. A method for producing a paint, wherein the finished paint is filtered using a device according to claim 1 before it is packed in a container.

* * * * *